United States Patent [19]

Bonniau et al.

[11] Patent Number: 5,641,955
[45] Date of Patent: Jun. 24, 1997

[54] RECONFIGURABLE BIREFRINGENT FIBER-OPTIC SENSOR WITH SHAPE-MEMORY ALLOY ELEMENTS

[75] Inventors: Philippe Bonniau, Houilles; Jean Chazelas, Paris; Marc Turpin, Bures S/Yvette, all of France

[73] Assignee: Thomson-CSF, Paris, France

[21] Appl. No.: 374,526

[22] PCT Filed: Jun. 10, 1994

[86] PCT No.: PCT/FR94/00690

§ 371 Date: Feb. 2, 1995

§ 102(e) Date: Feb. 2, 1995

[87] PCT Pub. No.: WO94/29674

PCT Pub. Date: Dec. 22, 1994

[30] Foreign Application Priority Data

Jun. 15, 1993 [FR] France .................. 93 07185

[51] Int. Cl.⁶ .................................. H01J 5/16
[52] U.S. Cl. .................. 250/227.14; 250/227.18; 385/13
[58] Field of Search .......... 250/227.14, 227.24, 250/227.16, 227.17, 227.18, 227.19; 385/12, 13, 75, 72, 126, 1, 11, 27, 39, 35, 65; 356/345, 365; 73/781, 789, 795, 802; 148/402; 60/527

[56] References Cited

U.S. PATENT DOCUMENTS

| | | |
|---|---|---|
| 4,249,924 | 2/1981 | De Panafieu et al. .................. 65/42 |
| 4,597,632 | 7/1986 | Mallinson .................. 385/72 |
| 4,881,981 | 11/1989 | Thoma et al. .................. 148/402 |
| 4,882,716 | 11/1989 | Lefevre et al. .................. 250/227 |
| 4,899,543 | 2/1990 | Romanelli et al. .................. 60/527 |
| 4,926,040 | 5/1990 | Turpin et al. .................. 250/227 |
| 4,928,005 | 5/1990 | Lefevre et al. .................. 250/227 |
| 4,969,017 | 11/1990 | Lefevre et al. .................. 356/35 |
| 5,058,973 | 10/1991 | Refregier et al. .................. 292/34 |
| 5,062,153 | 10/1991 | Turpin et al. .................. 250/227 |
| 5,064,270 | 11/1991 | Turpin et al. .................. 250/227.17 |
| 5,089,696 | 2/1992 | Turpin .................. 250/227 |
| 5,144,690 | 9/1992 | Domash .................. 385/12 |
| 5,167,684 | 12/1992 | Turpin et al. .................. 65/37 |
| 5,172,184 | 12/1992 | Turpin et al. .................. 356/35 |
| 5,305,401 | 4/1994 | Becker et al. .................. 385/24 |
| 5,309,533 | 5/1994 | Bonniau et al. .................. 250/227.17 |
| 5,309,540 | 5/1994 | Turpin et al. .................. 385/123 |
| 5,363,191 | 11/1994 | Refregier et al. .................. 356/34 |
| 5,377,802 | 1/1995 | Ide .................. 192/107 C |
| 5,381,005 | 1/1995 | Chazelas et al. .................. 250/227.19 |

*Primary Examiner*—Que Le
*Attorney, Agent, or Firm*—Oblon, Spivak, McClelland, Maier & Neustadt, P.C.

[57] ABSTRACT

A fiber-optic sensor composed of elements made of shape-memory alloy which, in one of their memorized shapes, impose a stress on the optical fiber, which stress is easy to locate with an interferometer. The multisensor configuration is thus easily reconfigurable.

12 Claims, 2 Drawing Sheets

RECONFIGURABLE BIREFRINGENT FIBER-OPTIC SENSOR WITH SHAPE-MEMORY ALLOY ELEMENTS

BACKGROUND OF THE INVENTION

The present invention relates to a reconfigurable fiber-optic sensor.

Fiber-optic temperature or stress sensors have been the subject of numerous studies throughout the world. The field of intrinsic temperature or stress sensors has expanded particularly by virtue of the use of an optical fiber as the sensor (use of high-birefringence or polarization-maintaining optical fibers).

Production of optical sensors distributed along a birefringent fiber has made it possible to use N elementary sensors corresponding to N segments of sensor fiber. These various segments are defined by using coupling points serving as markers (delimiting these segments).

The production of coupling points on optical fibers has been studied for a long time, and today various production techniques are used, among which are:

- splicing of two sections of the same fiber, that is to say cutting the fiber and bonding the two portions after having rotated one of the fiber portions through an arbitrary angle. The main drawbacks of this method are the introduction of losses due to the reflections off the faces of the fibers and the control of the alignment and rotation of the fiber cores (diameter of the order of 5 μm);

- melting of the fiber using localized heating. A section of the birefringent fiber of chosen length is held at its ends and the fiber is rotated at one end, the other remaining fixed. A torsional stress is thus created. Using localized heating of the fiber, a polarization coupling point is thus produced. The drawbacks of this method are the use of a locally stripped fiber, a high-voltage generator and an electric arc in order to create the coupling point or points, and the irreversibility of the method of creating the coupling points;

- the production of index gratings in the fiber using a masking method or using a holographic method. The production of coupling points using this method is nowadays mainly studied by the BERTIN Company and many studies have concerned the production of index gratings in the fibers for sensor applications. The drawback of this method resides in its complexity of implementation, the need to use an additional high-power laser to produce the index gratings, and the need to employ a process for masking the fiber.

From the German Document DE-A-4,011,440, a fiber-optic temperature sensor is known, to which an element, which may be made of shape-memory alloy, applies a longitudinal stress deforming this fiber into a "U". This sensor enables only the measurement of a single temperature to be made and does not enable the location, where the stress induced by the measured temperature change has occurred, to be located precisely. In addition, the deformation produced by the SMA element is not reversible.

SUMMARY OF THE INVENTION

The subject of the present invention is a birefringent fiber-optic sensor such that one or more precisely-located coupling points may be formed on this fiber without damaging it or cutting it, without introducing losses, without having recourse to additional equipment, and all this as simply as possible, this sensor making it possible to perform, at several precisely-located points, measurements of stresses which may have different origins, the positions of the measurement points being able to be easily modifiable.

The sensor according to the invention, of the birefringent fiber-optic type, at least part of which acts as a sensor of a physical quantity manifested by a stress exerted on the fiber, this optical fiber interacting with a light source and an interferometric or polarimetric read device, includes an element made of shape-memory alloy arranged on the optical fiber, this shape-memory element being designed and taught so that when it is at temperatures lying on one side of the transition temperature of the constituent material it exerts virtually no stress on the fiber, and when it is at temperatures lying on the other side of the said transition temperature it exerts on the fiber a stress which can be measured by the said read device, and it is characterized in that it includes several elements made of shape-memory alloy which are distributed along the optical fiber and in that the stress that these elements exert on the fiber is a radial stress.

According to another characteristic of the invention, at least part of the SMA elements is fixed to a structure whose deformations are measured, and the optical fiber is held taut between elements defining the measurement zones.

BRIEF DESCRIPTION OF THE DRAWINGS

The present invention will be better understood on reading the detailed description of several embodiments, taken by way of non-limiting examples and illustrated by the appended drawing in which.

DESCRIPTION OF THE PREFERRED EMBODIMENTS

Figure 1:
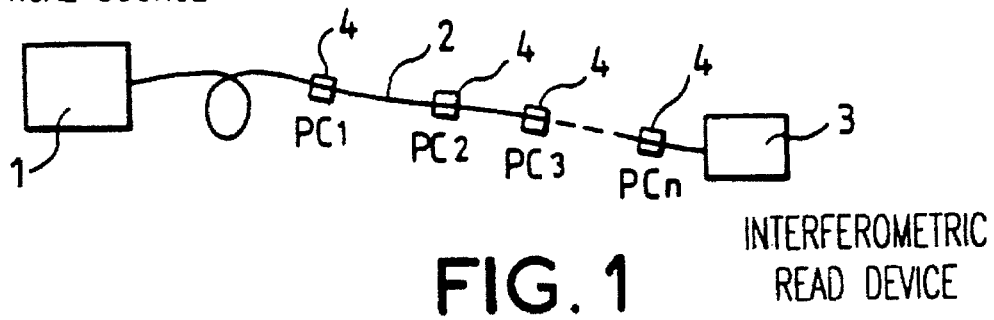
FIG. 1 is a block diagram of a sensor device in accordance with the invention.

The fiber-optic sensor shown diagrammatically in FIG. 1 makes it possible to measure, in a manner known per se, compressive stresses applied to various fiber sections delimited by coupling points CP1, CP2, etc. In addition, it makes it possible to measure temperatures (with a relatively low accuracy, but sufficient in certain fields of application where the temperature does not constitute a critical parameter) by virtue of the invention. Thus, the invention enables the influence of temperature on the stress measurements to be taken into account. In fact, variations in temperature of the fiber cause a variation in its length. Now, interferometric measurements carried out with the optical fiber rely on determining the position of interference peaks, which position varies if the length of the fiber varies. The device of the invention makes it possible to determine temperatures simply, as described hereinbelow, without using conventional temperature-measurement apparatuses, and therefore to correct, as the case may be, the stress measurements carried out, and this is so even if the location where the fiber is placed is not accessible (in order to insert a conventional temperature sensor there).

The sensor device of FIG. 1 is essentially composed of a source 1, for example a laser source, the light energy of which is injected into one end of a birefringent monomode optical fiber 2, the other end of which is coupled to an interferometric read device 3. The fiber 2 is of the polarization-maintaining type or high-birefringence type, for example of the FASE (side-hole fiber) type. The elements 1 and 3, being well known per se, will not be described.

In general, the fiber 2 serves as multisensors. For this purpose, it is delimited into sections by coupling points. Instead of producing the coupling points according to one of the known procedures described hereinabove in the preamble, the invention proposes to produce them in an easily reversible way, this making it possible, mainly, to reconfigure the arrangement of the sensors (in order to remove or add one or more of them, or to move one or more of them) without damaging the fiber. According to the invention, each coupling point is produced with the aid of an element 4 made of shape-memory alloy (SMA).

These SMA materials have been studied for many years throughout the world (see, in particular, the article "Shape Memory Alloys" which appeared in Scientific American, the publications "Shape Memory Alloys: Materials in Action" and "General Discussions: The use of Shape Memory Actuators" of the Catholic University of Louvain).

The materials mainly used are of the Ni—Ti type or copper alloys of the Cu—Al—Ni or Cu—Al—Zn type and the memory effect is based on a transition of the martensitic-austenitic type obtained by varying the temperature of the alloy studied, and associated with this effect is a shape change in the alloy.

The range of transition temperatures varies from one alloy type to another and generally lies between −100° and +200° C. Two types of memory should be distinguished: the one-way memory effect and the two-way memory effect. The two-way memory effect corresponds to reversibly passing from a high-temperature shape to a low-temperature shape simply by changing the temperature. The one-way effect corresponds to the memorizing of just a single shape. The material therefore readopts the shape it had in its martensitic phase before mechanical deformation. The production of springs, wires and sheets made of shape-memory alloys has found many applications in all kinds of fields, ranging from dental surgery to the automobile industry, including domestic appliances (a few potential applications identified are collected in the article by M. van Humbeek: "From a seed to a need: the growth of shape memory applications in Europe").

According to the invention, each coupling point CP1, CP2, etc. is produced with the aid of an SMA element. Preferably, this element is of the type having a two-way memory effect, and exerts, in one (high-temperature or low-temperature) of its memorized shapes, a quasi-isotropic stress in a plane substantially perpendicular to the axis of the fiber.

According to a preferred embodiment of the invention, the SMA element is ring-shaped. According to another preferred embodiment, it is tubular or alternatively in the form of a tubular helix. The internal diameter of the ring or of the helix is chosen, for one of the memorized shapes, equal to or slightly greater than the external diameter of the fiber. This external diameter of the fiber generally lies between approximately 100 µm (for example for a polarization-maintaining fiber with an epoxy-acrylate coating) and a few millimeters (for example a fiber of the FASE type with an additional PTFE protective jacket). The SMA alloy and the diameter of the wire used to produce the ring or the helix are chosen so that, for the other memorized shape, the SMA element exerts, on the fiber 2, a sufficiently large stress to be able to be detected by the reader 3, without, however, exceeding the elastic deformation limit of the silica constituting the fiber. In the case where such a risk would exist, the fiber may be fitted with a protective sleeve (for example made of plastic or of PTFE) at the location where the SMA element will be arranged. Of course, in such a case, the internal diameter of the ring or helix takes into account the thickness of this sleeve.

Figure 2:
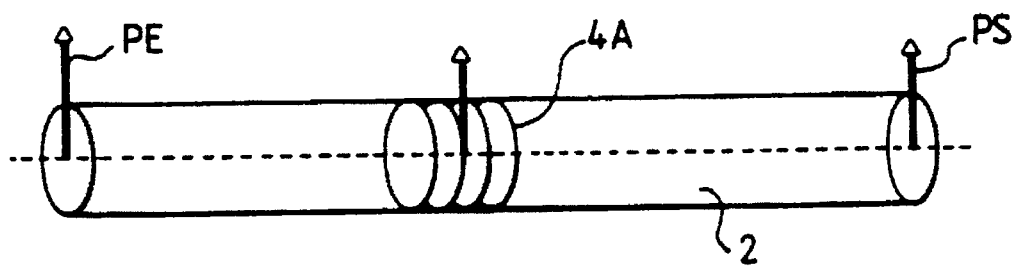
FIG. 2 is a view of a section of the optical fiber of FIG. 1, fitted with an element made of shape-memory alloy in accordance with the invention, showing, in the absence of stress on this fiber, the directions of the polarization of the input light energy and of the output light energy.
Figure 3:
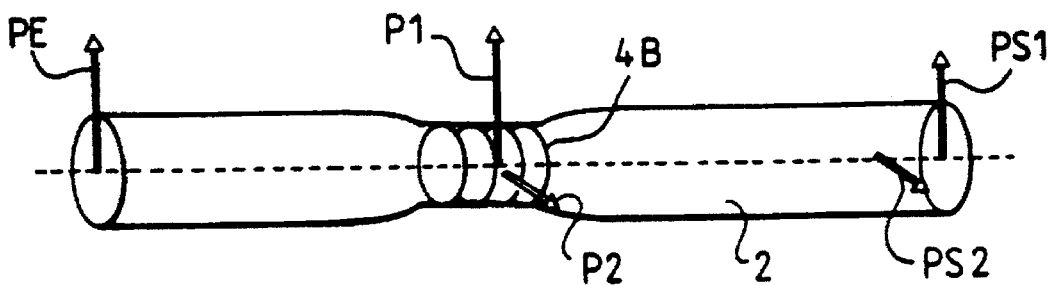
FIG. 3 is a view of the section of optical fiber of FIG. 2, when the said element exerts a stress on the fiber and showing the directions of the polarization of the input light energy and of the polarizations of the output light energy.

The ring or helix may be shaped either before installing it around the fiber or directly wound on the optical fiber. In the first case, the ring or helix, formed by several turns, generally touching, of SMA wire, is slid along the optical fiber up to the desired position. In the second case, the SMA wire is wound or coiled (advantageously by the technique called "wrapping") around the optical fiber at the desired position. In both cases, the SMA element is installed at the temperature for which the SMA element has its "expanded" shape (which shape corresponds to a ring or to a helix of internal diameter equal to or greater than the external diameter of the fiber). Generally, the SMA element is such that its "expanded" shape is obtained when it is at a temperature below the transition temperature of the SMA. This transition temperature may be chosen between approximately −100° C. and +200° C. depending on the alloy used, and in this general case it is chosen below the anticipated range of operating temperatures for the application. However, the reverse case ("expanded" shape corresponding to temperatures above the transition temperature of the SMA) may, of course, be envisaged. Thus, as depicted in FIG. 2, when the SMA element 4A is in its "expanded" shape, the polarization PO of the light downstream of the element 4A has the same direction as the polarization PI upstream of the element 4A.

Above the transition temperature, the diameter of the ring or helix decreases, thus creating a quasi-isotropic stress on the birefringent optical fiber. This stress is manifested by a rotation of the polarization axes of the fiber, that is to say that a coupling point is created on the optical fiber. In this case, a transfer of energy of a polarization axis P1 to an orthogonal axis P2 occurs at the coupling point, the axis P1 being of the same direction as the upstream polarization axis PI, and downstream of the "contracted" element 4B there is a polarization PO1 of the same direction as PI, and a retarded orthogonal polarization PO2.

Below the transition temperature, the SMA material reverts to its easily deformable martensitic phase. Using the energy induced by the return of the optical fiber to its initial diameter, the SMA helix or ring resumes the diameter "learnt" during manufacture, thereby making it release the stresses exerted on the optical fiber. Consequently, the formation of the coupling point is reversible. It is therefore possible to remove the coupling point, or to move it. Of course, the same is true for all the coupling points CP1, CP2, etc.

According to a first embodiment of the invention, a multisensor system is produced with the aid of an optical fiber along which several identical SMA helices, such as the one described hereinabove, are arranged, each determining one coupling point. The addressing and reading of the sensors distributed along the optical fiber 2 and delimited by these coupling points are carried out in a manner known per se by interferometry or polarimetry, connecting, as explained hereinabove, one end of the fiber 2 to a light source 1 and the other end to an interferometer 3, for example of the Michelson type. This applies for all the other embodiments of the invention.

According to another embodiment of the invention, the SMA helices or rings have different compositions and therefore different transition temperatures. A distributed-sensor multisensor system is thus formed. These sensors then make it possible to follow the change in the mechanical stress measured as a function of temperature, if they are all subjected to the same stress. It is also possible to correct the values measured by these sensors so as to render the measurements independent of the temperature variations to which the various sensors are subjected.

According to another embodiment of the invention, each coupling point is determined by a helix made of an SMA with a composition gradient. For example, the composition of the SMA material may be constant along one turn and be different for the next turn, and so on. It is then possible to measure the temperature variations to which each helix is subjected by measuring the variation in the light-energy intensity due to a variation in the stress applied by the helix to the optical fiber as a result of a variable number of turns compressing the optical fiber. It is generally possible to measure the order of ten different light intensities for the same coupling point. A helix having turns of approximately ten different compositions may therefore be arranged at each coupling point.

According to an illustrative embodiment of the invention, an SMA helix is produced from an SMA wire of a diameter of approximately 60 µm wound on an optical fiber of a diameter of approximately 250 µm. The SMA alloy is, for example, of the Cu—Al—Ni, Cu—Al—Zn or Ni—Ti type. The length of the helix is then less than 1 mm and the helix is composed of the order of ten touching turns.

The applications of the device of the invention are manifold, in particular in cases where optical fibers with fixed and irreversible coupling points have already been used. In these cases, the invention enables the positions of the coupling points to be modified.

In addition, the invention makes it possible to take into account the various temperature effects and consequently to correct the mechanical-stress measurements and/or to measure, in addition (with a relatively low accuracy), the temperatures to which the various sensors are subjected.

Among the many applications, mention may be made of the detection of localized overheating, the detection of fire, the local measurement of temperature in electronic circuits, in particular high-density high-power circuits.

It is also possible to include an optical fiber equipped with SMA devices of the invention in a composite structure in order to form sensors detecting damage to this structure.

Of course, it is possible selectively to control, using the Joule effect, the SMA elements in order to configure, as required, various sections of the optical fiber in order to make the system relatively independent of ambient temperature. For this purpose, an electric power generator is selectively connected to one or to some of the SMA elements in order to make them pass from the "expanded" or "contracted" state depending on the case, their transition temperature being chosen as a consequence.

Figure 4:
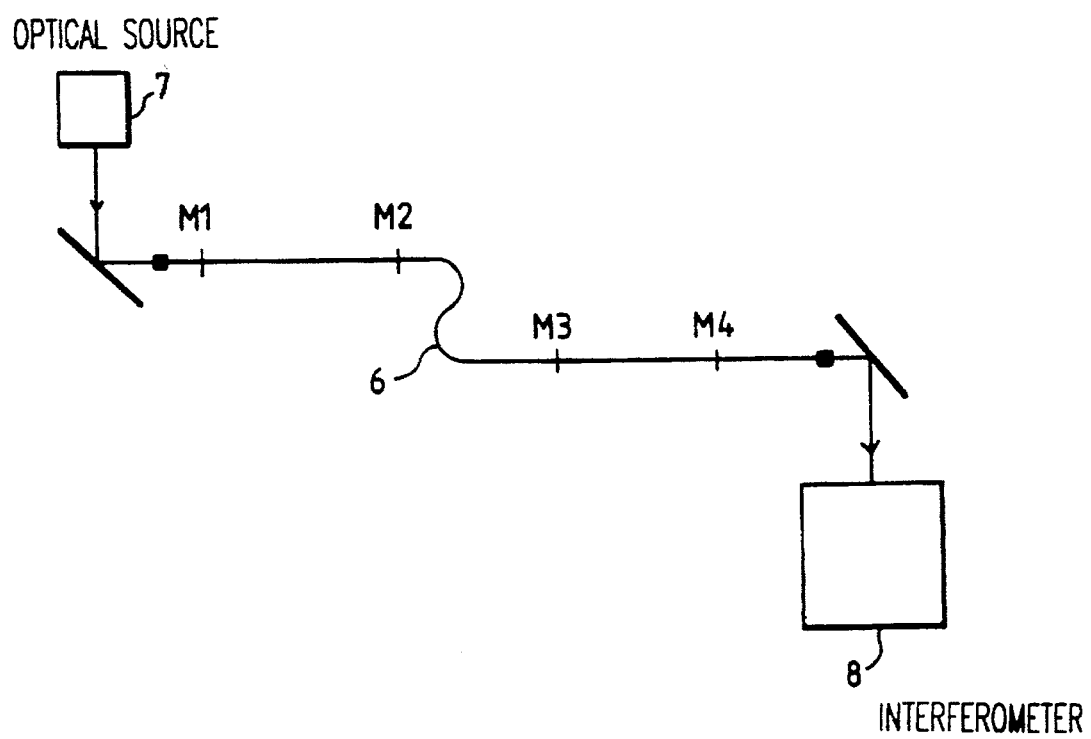
FIG. 4 is a simplified diagram of a sensor of the invention for the measurement of strains.

Diagrammatically depicted in FIG. 4 is a sensor principally intended for measuring variations in dimensions (elongations, contractions, etc.), taking into account the temperature of the place of measurement.

The sensor of FIG. 4 includes a monomode birefringent optical fiber 6. This fiber 6 may, for example, be fixed to a structure (fuselage, aircraft wing, etc.) for which it is desired to determine the deformations in various zones or in various directions. Of course, the path of the fiber 6 on the structure in question is not necessarily linear and may even be highly sinuous, depending on the relative arrangements of the various measurement zones.

The fiber 6 is fixed to the structure with the aid of SMA rings or helices of the type described hereinabove. These rings or helices are fixed in an appropriate way (bonding, welding, etc.) to the structure, it being possible for the fiber to be inserted into these rings or helices before or after fixing them to the structure. These rings or helices are generally taken in pairs in order to define, each time, a measurement interval, as for example those arranged at the points M1 and M2 on the one hand, and at the points M3 and M4 on the other hand. In the intervals M1–M2 and M3–M4, the fiber 6 is held taut, and outside these intervals it can adopt any path. However, the rings or helices may also be taken in threes or in groups of greater numbers in order to define contiguous measurement intervals. The installation of the optical fiber in the rings or helices at the points M1 to M4 takes place at an "installation" temperature corresponding to the "expanded" state of the rings or helices, and then the fiber is pulled taut, in any appropriate manner, in the various measurement intervals, and the temperature of the rings or helices is changed to the other side of the transition temperature of the SMA material with respect to the said installation temperature, this changing the rings or helices into the "contracted" state; the SMA elements grip the fiber 6 strongly, which remains taut at least in the measurement intervals.

One end of the fiber 6 is connected to a source 7, for example a superluminescent light-emitting diode, and its other end is connected to an interferometer 8.

The lengths L1, L2 of the intervals M1–M2 and M3–M4 are determined at rest, in a manner known per se, using the interferometer 8. Next, the structure carrying the fiber 6 is subjected to various planned tests and, using the interferometer 8, the possible variations of these intervals, L1+ΔL1 and L2+ΔL2 (in algebraic values), are determined. Advantageously, several SMA rings or helices having different transition temperatures may be arranged at each measurement point (M1 to M4). Thus, it is possible to know, to a good approximation, the temperature to which the optical fiber is subjected in the measurement zone and therefore to discriminate the length variation of the fiber due to the possible temperature variation from the length variation due to stresses undergone by the structure.

In summary, the device of the invention makes it possible to produce, simply, polarization coupling points and, simultaneously, to create temperature sensors, this being so for most types of birefringent optical fibers. The operating temperatures of such sensors may lie within a wide range of values (currently, approximately −100° C. to +200° C). In all cases, the coupling points are reversible, without damaging the optical fiber. In the case of measurements of length variations, the device of the invention has, compared to strain-gauge devices, the following advantages: insensitivity to electromagnetic interference and to the environment, and use of a single fiber for a large number of measurement points (instead of a large number of electrical wires).

What is claimed as new and desired to be secured by Letters Patent of the United States is:

1. A reconfigurable birefringent optical fiber sensor, comprising:

a birefringent optical fiber supporting first and second propagating modes with first and second polarizations, respectively, in which the second polarization is different from the first polarization, and wherein there is coupling of electromagnetic energy between the first and second modes when the birefringent optical fiber experiences a mechanical stress or strain;

a light source coupled to a first end of said birefringent optical fiber, wherein the light source excites within the optical fiber the first propagating mode with the first polarization;

one or more shape-memory alloy elements, each having a transition temperature and being sensitive to a temperature, and arranged on the outside of the optical fiber, each shape-memory alloy element exerting substantially no stress or stain on the optical fiber when there is a first relationship between its transition temperature and the temperature sensed by the shape-memory alloy element and exerting a stress or strain on the optical fiber when there is a second relationship between its transition temperature and the temperature sensed by the shape-memory alloy element, wherein the stress or strain so exerted on the optical fiber by the shape-memory alloy element causes said coupling between the first and second propagating modes with the first and second polarizations, thereby allowing the light source to excite the second propagating mode with the second polarization; and means for detecting first and second propagating modes with first and second polarizations.

2. A sensor as set forth in claim 1, comprising:

each of the one or more shape-memory alloy elements having the same transition temperature.

3. A sensor as set forth in claim 1, comprising:

at least two shape-memory alloy elements with different transition temperatures.

4. A sensor as set forth in claims 1, 2, or 3, wherein the means for detecting the first and second propagating modes comprises:

means for detecting an interference-peak shift arising from the length variation of the optical fiber as a result of temperature variations to which the optical fiber is subjected to.

5. A sensor as set forth in claims 1, 2, or 3, wherein each of the one or more shape-alloy elements is in the form of a tubular helix.

6. A sensor as set forth in claim 5, wherein each of the one or more shape-memory alloy elements comprises a shape-memory alloy having a composition gradient.

7. A sensor as set forth in claim 5, wherein each of the one or more shape-memory alloy elements comprises a wire having a diameter of approximately 60 μm and is in the form of a helix with approximately ten turns wrapped around the optical fiber.

8. A sensor as set forth in claim 6, wherein each of the or more shape-memory alloy elements is comprised of a wire having a diameter of approximately 60 μm and is in the form of a helix with approximately ten turns wrapped around the optical fiber.

9. A sensor as set forth in claims 1, 2, or 3, wherein each of the one or more shape-memory alloy elements is in the form of a ring.

10. A sensor as set forth in claim 4, wherein each of the one or more shape-memory alloy elements is in the form of a ring.

11. A sensor as set forth in claims 1, 2, or 3, wherein each of the one or more shape-memory alloy elements has a tubular shape.

12. A method for sensing the deformation of a physical structure, comprising the steps of:

providing a birefringent optical fiber with a plurality of shape-memory alloy elements arranged on the outside of the birefringent optical fiber and defining a measurement zone;

physically coupling the plurality of shape-memory alloy elements to the physical structure;

maintaining the birefringent optical fiber taut within the measurement zone;

exciting a first mode with a first polarization within the optical fiber by a light source;

receiving light from a second end of the optical fiber; and detecting in the light received from the second end of the optical fiber the presence of the first mode and a second mode with a second polarization, wherein the second mode is excited by the first mode when the shape-memory alloy elements cause a stress or stain to be applied to the optical fiber due to the physical deformation of the physical structure, thereby indicating said deformation.

\* \* \* \* \*